United States Patent
Ambrose

(10) Patent No.: US 7,229,049 B2
(45) Date of Patent: Jun. 12, 2007

(54) UNITIZED ROTARY ACTUATOR HINGE FITTING

(75) Inventor: David R. Ambrose, Quartz Hill, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 114 days.

(21) Appl. No.: 10/838,959

(22) Filed: May 4, 2004

(65) Prior Publication Data

US 2006/0243864 A1    Nov. 2, 2006

(51) Int. Cl.
*B64C 3/38*    (2006.01)

(52) U.S. Cl. ..................................... 244/213

(58) Field of Classification Search ............... 244/219, 244/213, 214, 215, 211, 212; 16/54, 50, 16/221

See application file for complete search history.

(56) References Cited

U.S. PATENT DOCUMENTS

| | | | |
|---|---|---|---|
| 2,516,935 A | * | 8/1950 | Weaver .................... 16/50 |
| 4,553,722 A | * | 11/1985 | Cole ........................ 244/219 |
| 5,941,480 A | * | 8/1999 | Wille ....................... 244/131 |
| 6,213,433 B1 | * | 4/2001 | Gruensfelder et al. ...... 244/219 |
| 6,270,039 B1 | * | 8/2001 | Linjama .................... 244/213 |

* cited by examiner

*Primary Examiner*—Tien Dinh
(74) *Attorney, Agent, or Firm*—Koestner Bertani LLP; Mary Jo Bertani

(57) ABSTRACT

An apparatus and method for installing a plurality of rotary actuator segments in a device includes a unitary hinge fitting. The unitary hinge fitting includes a first side couplable to a control surface, and a plurality of bays. Each bay is configured to receive at least one of the rotary actuator segments. The unitary hinge fitting reduces the number of components required to install rotary actuators by eliminating the shims, the shear clips, and some of the fasteners required to attach the shims and the shear clips to the hinge fittings. The resulting assembly is typically much simpler and lower in cost and weight than conventional rotary actuator installations.

17 Claims, 6 Drawing Sheets

UNITIZED ROTARY ACTUATOR HINGE FITTING

GOVERNMENT INTEREST

This invention was made with Government support under Contract Number N0019-02-C-3002 awarded by The Department of the Air Force. The Government has certain rights in this invention.

BACKGROUND

Some aircraft use a common wing leading edge flap rotary actuator system (LEFAS) that essentially uses shaft driven geared rotary actuators to rotate the wing leading edge flap. Some known configurations use between two and six assemblies of rotary actuators to drive a control surface, such as a leading edge flap (LEF). Each actuator assembly can include multiple actuator slices or geared segments. Each actuator slice requires a structural hinge fitting that attaches the actuator to the LEF. The hinge fittings are often referred to as "tie bars" because they are typically made from titanium.

FIG. 1 shows an example of a known rotary actuator assembly 100 that includes a machined titanium hinge fitting 102 for each actuator segment (not shown). FIG. 2 shows a perspective view of one of the hinge fittings 102 of FIG. 1. Each hinge fitting 102 is coupled to the inner portion of a control surface 104 at attachment points 106. Hinge fitting 102 includes lugs 108 that are connected to the rotary actuator segments. The control surface 104 moves as the actuator segments rotate. Typically, a hinge fitting 102 is used between each segment of the rotary actuator. Each actuator assembly 100 can include multiple actuator segments, depending on the forces to be encountered on the control surface 104.

Hinge fittings 102 are installed within control surface 104 by inserting shims 110 between each hinge fitting 102, and between the hinge fittings 102 and a spar 112 in the control surface 104. Shear clips 114 are fastened to the sides of each hinge fitting 102 to provide structure for mounting the hinge fittings 102 to the spar 112. Multiple hinge fittings 102 are typically required in order to avoid excessive forces on any one hinge fitting 102 and to allow the hinge fittings 102 to be individually shimmed into place in the presence of surface height variations along the spar 112.

Using individual hinge fittings between rotary actuator segments is very costly to assemble due to the large number of parts involved including multiple actuator segments, a hinge fitting for each actuator segment, four or more shims per hinge fitting, a shear clip between each hinge fitting, and any associated fasteners.

SUMMARY

Embodiments of the present invention can dramatically reduce the number of components required to install rotary actuators by eliminating the shims, the shear clips, and some of the fasteners required to attach the shims and the shear clips to the hinge fittings. The resulting assembly is typically much simpler and lower in cost and weight than conventional rotary actuator installations.

In some embodiments, an apparatus for installing a plurality of rotary actuator segments in a device includes a unitary hinge fitting. The unitary hinge fitting includes a first side couplable to a control surface, and a plurality of bays. Each bay is configured to receive at least one of the plurality of the rotary actuator segments.

In other embodiments, a device includes a hinge assembly for a movable surface. The hinge assembly includes at least one hinge fitting that can be connected to the movable surface. Each hinge fitting includes multiple hinge fitting lugs that can be connected to corresponding rotary actuator segments, so that rotation of the actuators produces movement of the surface.

In still other embodiments, a method for configuring rotary actuators includes configuring a hinge fitting with multiple bays. Each bay receives a corresponding rotary actuator segment. The hinge fitting can be coupled between a device and a control surface, and to the rotary actuator segments, so that rotation of the rotary actuator segments produces movement of the control surface.

In still further embodiments, a method for configuring rotary actuators includes configuring a control surface to receive a at least a portion of a hinge fitting. The hinge fitting includes a plurality of bays that are configured to receive a corresponding plurality of rotary actuator segments. The hinge fitting can be coupled between a device and the control surface, such that rotation of the rotary actuator segments produces movement of the control surface.

The foregoing has outlined rather broadly the features and technical advantages of embodiments of the present invention so that those skilled in the art may better understand the detailed description of embodiments of the invention that follows.

BRIEF DESCRIPTION OF THE DRAWINGS

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION OF THE DRAWINGS

Figure 1:
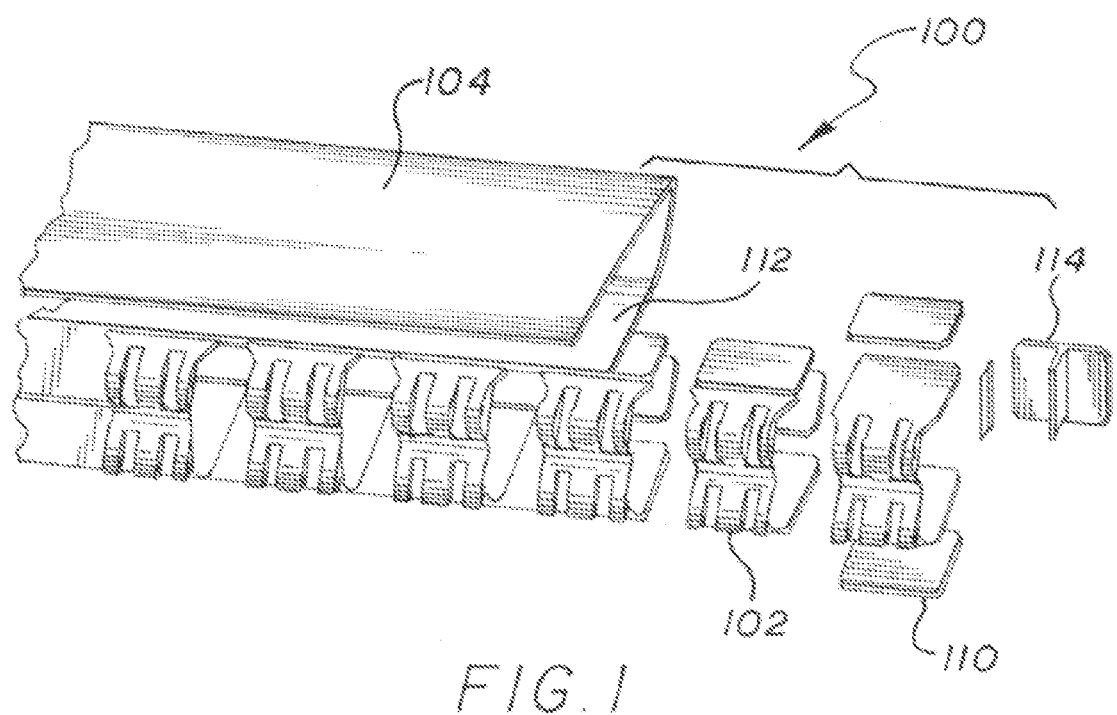
FIG. 1 is a partially exploded view of a control surface configured with multiple hinge fittings for rotary actuator segments.
Figure 3:
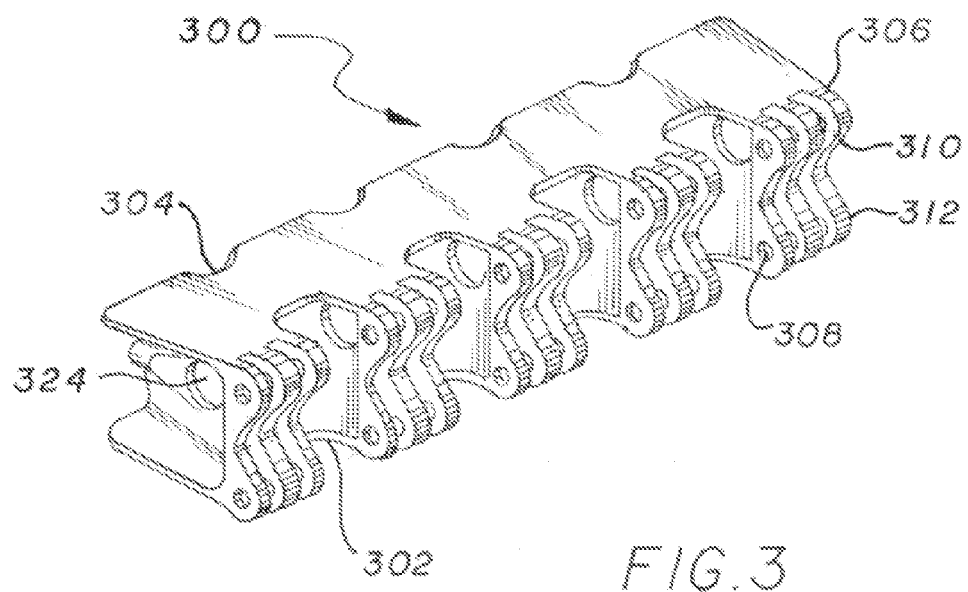
FIG. 3 is a front perspective view of an embodiment of a hinge fitting in accordance with the present invention.

FIG. 3 shows a perspective view of an embodiment of an apparatus for installing rotary actuator segments (not shown)

includes a hinge fitting 300 connectable to a movable control surface or other device, such as the control surface 104 shown in FIG. 1. The hinge fitting 300 includes multiple bays 302 that are configured to receive one or more corresponding rotary actuator segments (not shown). The number of bays 302 included in the hinge fitting 300 can vary depending on the loads to be placed on the control surface, and the number of rotary actuator segments required to move the control surface under load conditions.

In some embodiments, at least a portion of the hinge fitting 300 is generally configured to fit within a portion of the control surface that will be driven by the rotary actuator segments, however, the hinge fitting 300 can also be configured to be mounted fully internal or external to the control surface. The height of the hinge fitting 300 can be sized to fit within a desired control surface or other device. The dimensions of the hinge fitting 300 can also be tapered in any direction to fit within a device that does not have a uniform space in which to position the hinge fitting 300.

In situations where the control surface will be subject to bending, the hinge fitting 300 can be configured for increased flexibility to bend with the control surface. For example, aircraft control surfaces are often subject to bending forces during flight, and it is desirable for the components in the control surface to bend at least some extent with the control surface. Such flexibility can be achieved by limiting the strength of the material comprising hinge fitting 300, reducing the thickness of hinge fitting 300, and/or creating recessed portions 304 in hinge fitting 300. Recessed portions 304 can be formed by casting, machining, or any other suitable method. The amount of material to be reduced in the recessed portions 304 can be adapted to ensure that load is distributed between the control surface 104 and the hinge fitting 300 as desired. The hinge fitting 300 can be configured for increased flexibility using any other suitable structural feature in addition to, or instead of, recessed portions 304.

The hinge fitting 300 can also be configured with one or more series of spaced lugs 306. The space between each lug 306 is configured to accommodate lugs on the actuator segments, as further described below. Each lug 306 can include one or more holes 308 through which a pin (not shown) can be inserted to couple the hinge fitting 300 to the actuator segments. In the embodiment shown, each lug 306 includes two lobe portions 310, 312, and a hole 308 is configured through each lobe portion 310, 312.

Figure 4:
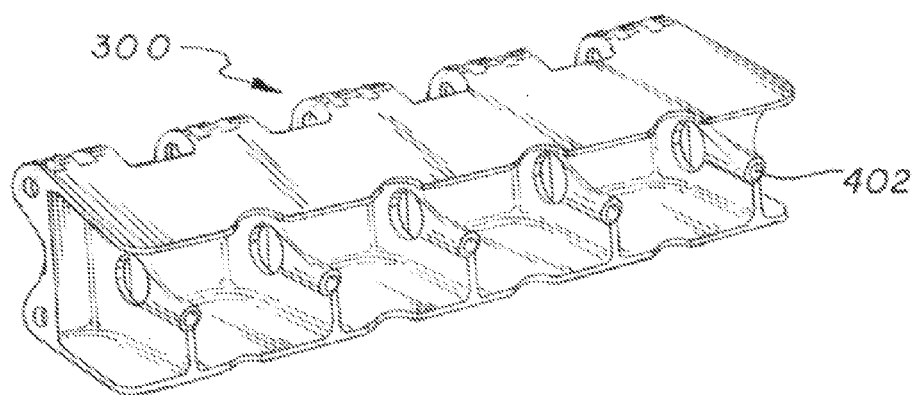
FIG. 4 is a rear perspective view of the embodiment of the hinge fitting shown in FIG. 3.
Figure 5:
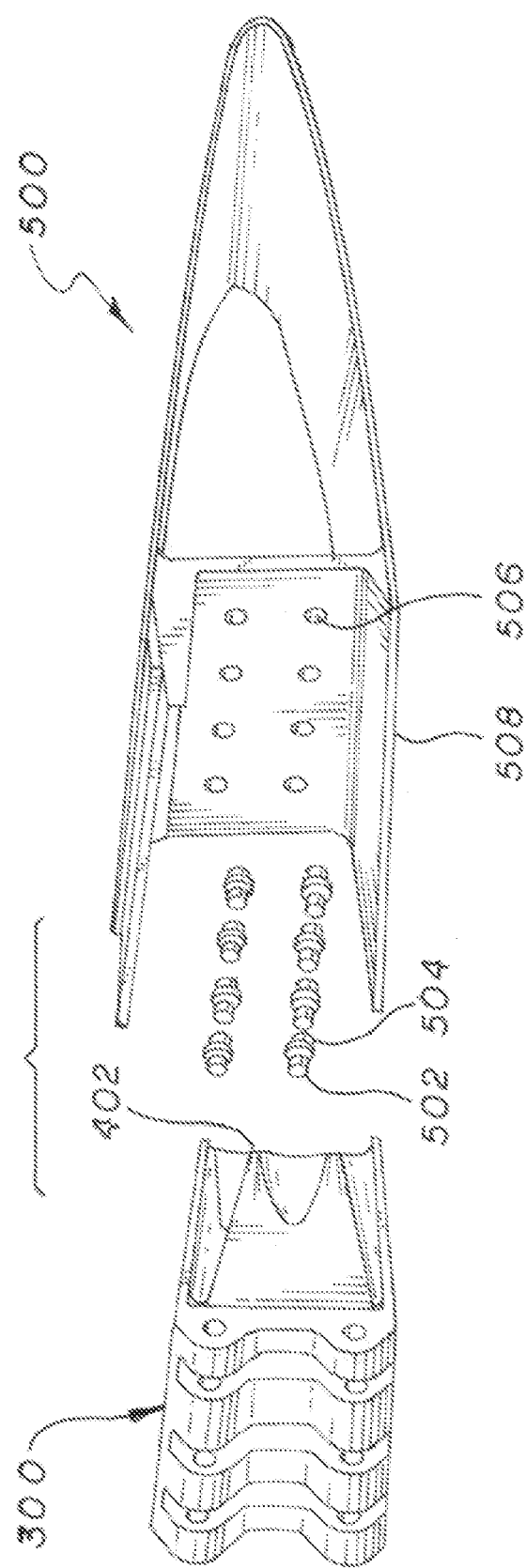
FIG. 5 is an exploded perspective view of an embodiment of a hinge fitting assembly in accordance with the present invention.

FIG. 4 shows a perspective view of another side of the hinge fitting 300. One or more shear pin ports or slots 402 can be configured on the hinge fitting 300 to receive a shear pin (not shown). FIG. 5 shows an exploded perspective view of an embodiment of a hinge assembly 500 including multiple shear pins 502. One end of each shear pin 502 can be configured to be inserted in the shear pin slots 402 and another end of the shear pins 502 can be configured to be inserted in corresponding shear pin interfaces 504. In some embodiments, the inner diameter of the shear pin slot 402 and the shear pin interface 504 can be slightly less than the diameter of the shear pin 502, thereby creating a snug fit between the shear pin 502, the shear pin slot 402, and the shear pin interface 504 to help prevent substantial movement of the shear pin 502 under operating conditions.

Figure 6:
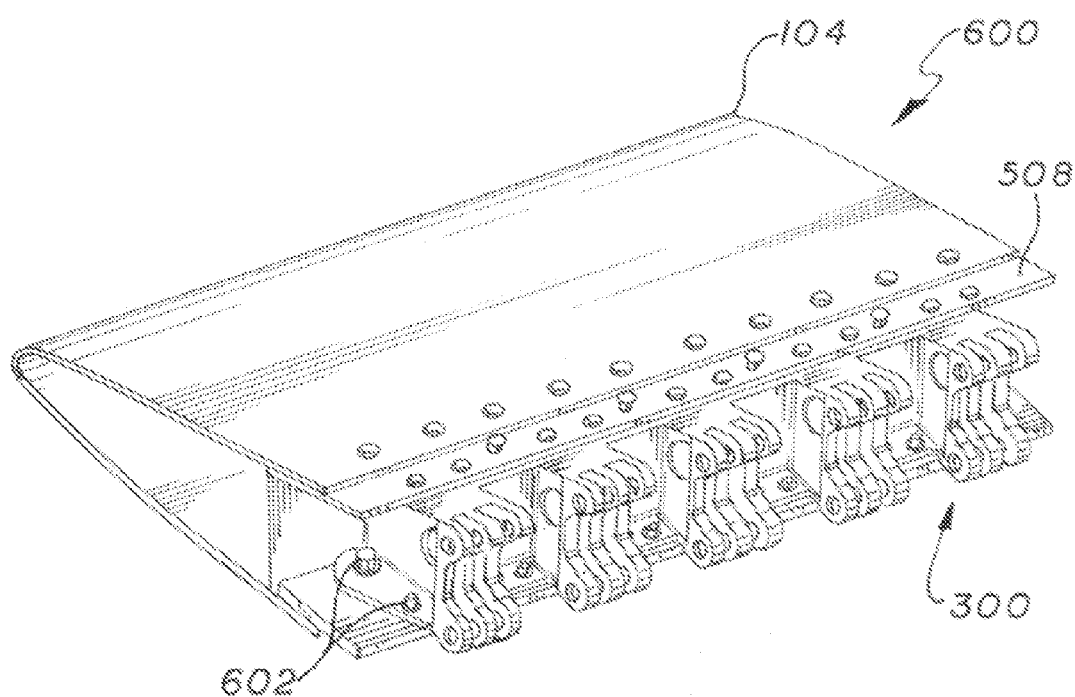
FIG. 6 is a perspective view of the embodiment of the hinge fitting assembly shown in FIG. 5.

The shear pin interfaces 504 can be mounted in interface ports 506 in a spar web 508. The spar web 508 can be mounted in the inner portion of control surface 104, as shown in FIGS. 5 and 6. Any suitable fastener or bonding method can be used to attach the spar web 508 in the control surface 104. The shear pins 502 and shear pin interfaces 504 provide means to couple the hinge fitting 300 to the spar web 508 and thus to the control surface 104. Any suitable method or mechanism for coupling the hinge fitting 300 to the control surface 104 can be utilized, however, in addition to, or instead of, the shear pin interfaces 504 and shear pins 502.

The spar web 508 can span the entire length of the control surface 104, or just one or more portions of the control surface 104, as required. Additionally, areas of the inner portion of the spar web 508 can be removed, as required, to accommodate the hinge fitting 300. In some embodiments, lay-up material can be included on the inner surfaces of spar web 508 and removed as required to provide a snug fit between the sides of the hinge fitting 300 and the spar web 508. The lay-up material can be any suitable material including the same or similar material from which spar web 508 is constructed. The ability to customize the spar web 508 eliminates the shims 110 (FIG. 1) required in conventional assemblies.

In some embodiments, the lay-up material in the spar web 508 can be removed with a precision integrated milling machine and leveling device (not shown). One such device is manufactured by Dorries Scharmann of Bielefeld, Germany. In some embodiments, the milling machine is operated in an environment that is temperature and humidity controlled to achieve desired accuracies. The hinge assembly 500 can be assembled in similar ambient conditions. In other embodiments, customized spar web 508 and hinge fitting 300 can be created by precision machining, casting, forging or other suitable methods.

Referring again to FIG. 3, the hinge fitting 300 can also be configured with holes 324 through the sides of each of the bays 302 through which subsystem components, such as hydraulic or electrical lines, among others, can be routed. In some embodiments, shear pins 502 and shear pin interfaces 504 penetrate no further into the inner portion of the control surface 104 than spar web 508. The shear pin slots 402 can also be configured to extend into hinge fitting 300 to a depth that does not extend to holes 324 to avoid interference with subsystem components. The hinge assembly 500 thus has a lower RADAR cross-section and is easier to assemble than prior art configurations.

The open-faced bays 302 of the hinge fitting 300 allow rotary actuator segments to be easily inserted and removed, as well as allowing access to the entire unitized hinge fitting 300, thereby enhancing assembly and minimizing machining time. In addition to being machined from titanium, steel, or other metallic alloys, hinge fitting 300 can also be constructed using any other suitable materials and fabrication techniques, such as forging or casting. The open-faced configuration of the bays 304 allows the hinge fitting 300 to be easily removed from molds during fabrication.

FIG. 6 shows an embodiment of a hinge assembly 600 that includes fasteners 602 for coupling the hinge fitting 300 to spar web 508. In some embodiments, planar portions of the hinge fitting 300 adjacent to the spar web 508 can include holes (not shown) in which fasteners 602 can be mounted to attach hinge fitting 300 to spar web 508. Any suitable fastening or bonding method can be used, such as, for example, rivets, screws, bolts, welding, adhesives, or other surface bonding methods.

Figure 7:
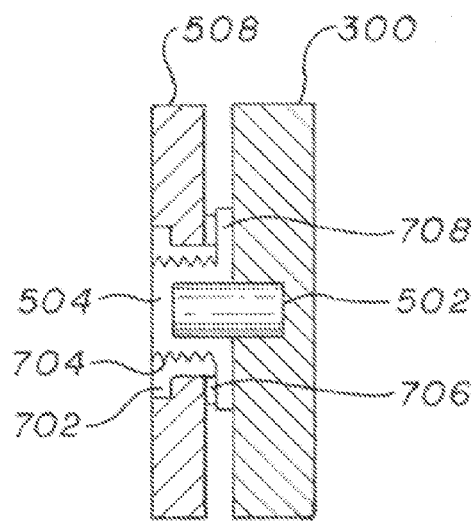
FIG. 7 is a cross-sectional view of a shear pin engaged in a shear pin interface to couple the hinge fitting of FIG. 3 to a spar web.

FIG. 7 shows a cross-sectional view of an embodiment of the shear pins 502 inserted in the hinge fitting 300 and the shear pin interface 504 inserted in the spar web 508. In some embodiments, a load bearing member, such as a bushing 702, can be included in the spar web 508 to bear the loads exerted on the shear pin interface 504, thereby avoiding damage to the spar web 508. The shear pin interface 504 can include a threaded portion that engages a threaded portion 704 of the bushing 702 to prevent substantial movement of the shear pin interface 504. Another load bearing member, such as washer 706, can be inserted between the spar web 508 and a flange 708 configured around the shear pin interface 504 to further distribute forces on the shear pin interface 504 to the spar web 508.

Figure 8:
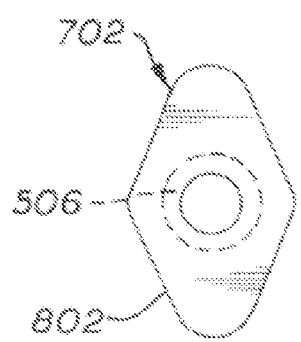
FIG. 8 shows an embodiment of a bushing including a base portion elongated in one direction that can be positioned in a countersunk hole to prevent the bushing from rotating.

FIG. 8 shows an embodiment of the bushing 702 including a base portion 802 elongated in one direction that can be positioned in a countersunk hole in the spar web 508 to prevent the bushing 702 from rotating. In other embodiments, the base portion 802 can be constructed using other suitable shapes, such as hexagonal, octagonal, and rectangular shapes.

Figure 9:
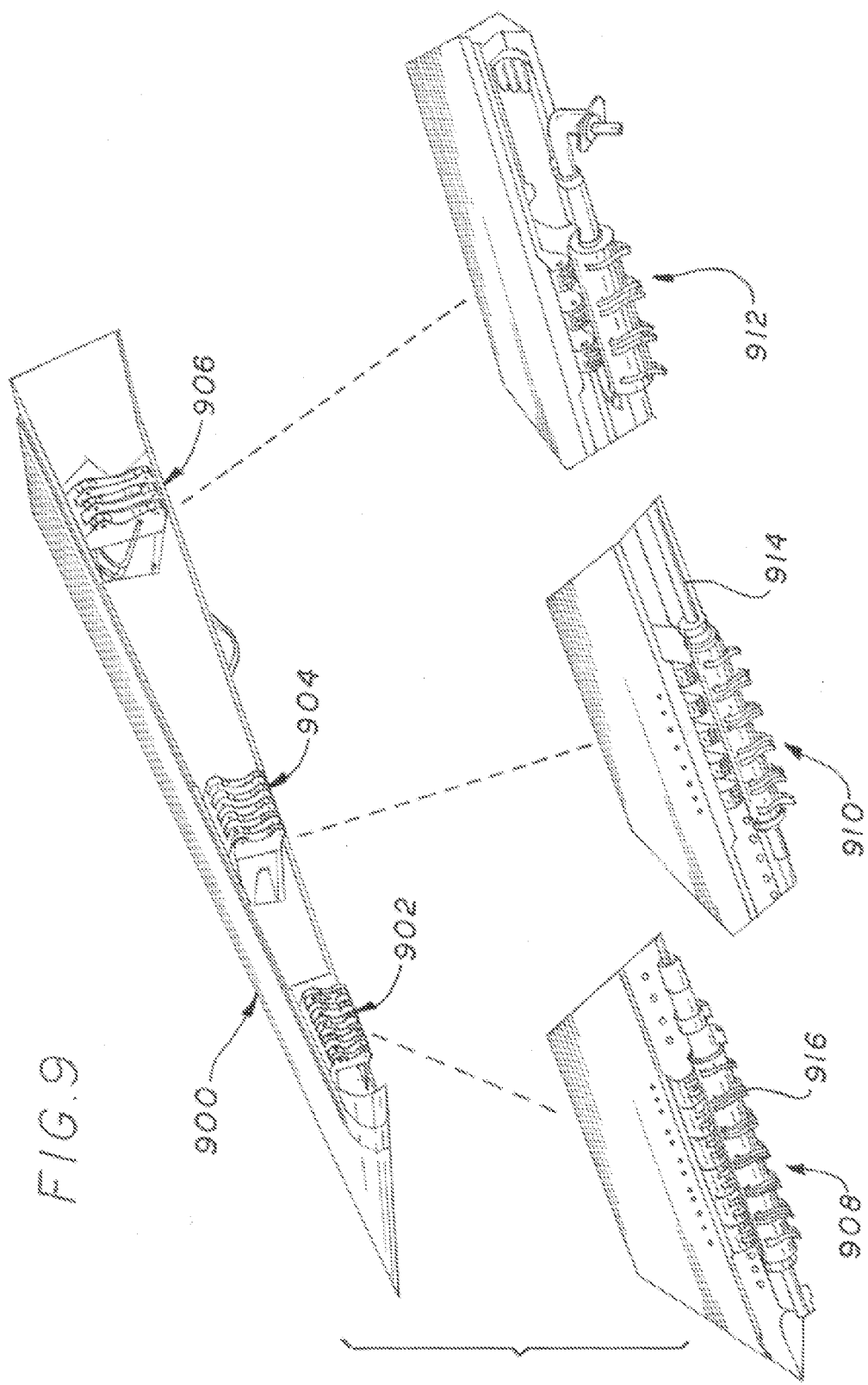
FIG. 9 is a perspective view of multiple hinge fitting assemblies in a control surface.

FIG. 9 shows a perspective view of an embodiment of a leading edge flap (LEF) 900 configured with inboard, midspan, and outboard hinge fittings 902, 904, 906. FIG. 9 also shows examples of rotary actuator assemblies 908, 910, 912 coupled to the hinge fittings 902, 904, 906, respectively. A torque shaft 914 is typically coupled to the ends of the rotary actuator assemblies 908, 910, 912 to drive rotary actuator segments 916 to the desired positions. Note that the height of the hinge fittings 902, 904, 906 varies along the length of the LEF 900, which tapers downward from the inboard section to the outboard section.

Figure 2:
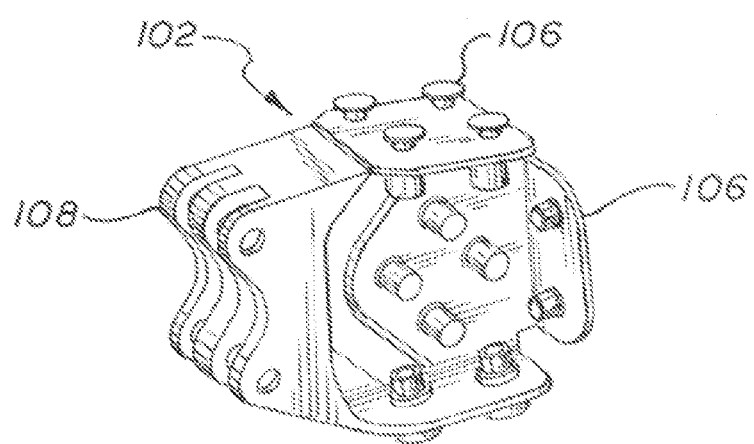
FIG. 2 is a perspective view of a rotary actuator hinge fitting for a control surface.
Figure 10:
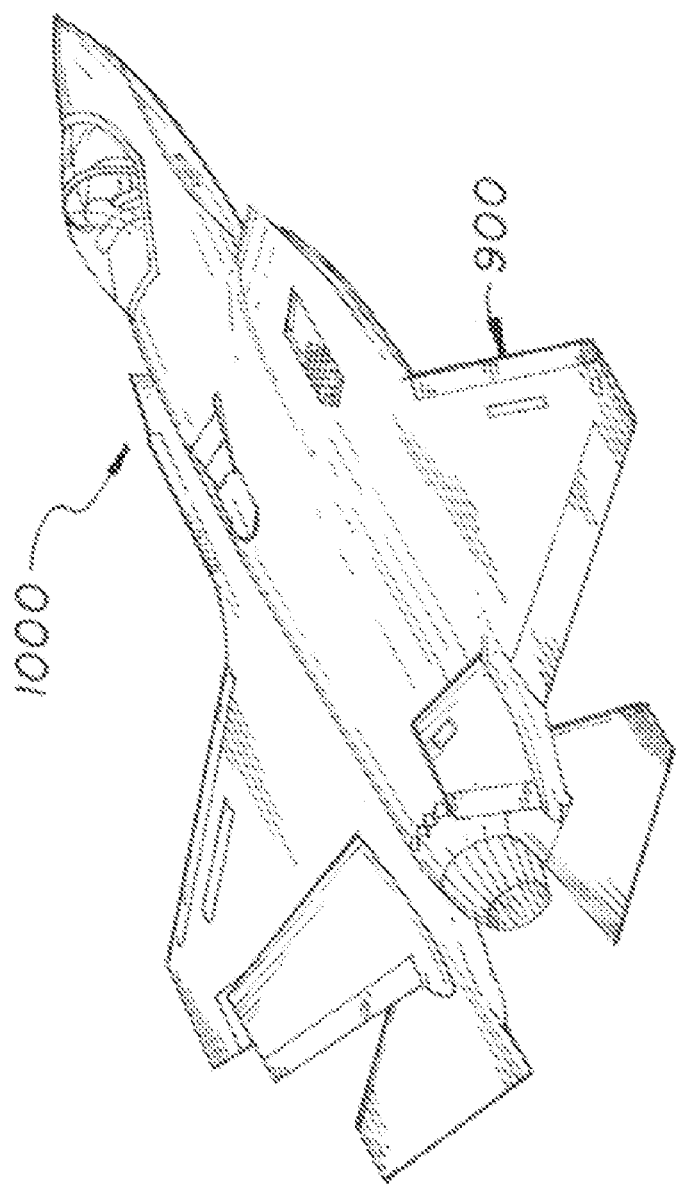
FIG. 10 is a perspective view of an embodiment of an aircraft configured with control surfaces that can utilize the rotary actuator hinge fitting assembly of FIG. 9.

FIG. 10 shows an embodiment of an aircraft 1000 that can utilize the leading edge flap 900 shown in FIG. 9. Embodiments of the present hinge fitting 300 replace a multitude of components such as individual hinge fittings 102 and shims 110 required in the prior art assembly shown in FIGS. 1 and 2. In one aircraft configuration, the total number of parts was reduced from fifty-six components to install rotary actuator segments to six hinge fittings 300. In addition to the reduction in parts and associated weight, hinge fitting 300 and hinge fitting assemblies 500 can save costs and assembly time. Rotary actuator hinge fitting 300 and hinge fitting assemblies 500 can be utilized to rotate control surfaces or other components of any type of device such as aircraft, automobiles, and boats, among other devices.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed is:

1. A device comprising:
    at least one hinge fitting connectable to a movable surface, and including a plurality of hinge fitting lugs connectable to a corresponding plurality of rotary actuator segments; and
    a spar web including a plurality of ports configured to receive a plurality of shear pins to couple the at least one hinge fitting to the spar web.

2. The device as set forth in claim 1, wherein each hinge fitting includes a plurality of bays configured to receive a corresponding rotary actuator segment.

3. The device as set forth in claim 1, further comprising a spar web; wherein an inner portion of the spar web can be removed to accommodate the at least one hinge fitting.

4. The device as set forth in claim 1, further comprising shear pin interfaces mounted in the spar web ports.

5. The device as set forth in claim 1, wherein the at least one hinge fitting includes a plurality of shear pin slots configured to receive corresponding shear pins.

6. The device as set forth in claim 1, further comprising reduced cross-sections of material in the at least one hinge fitting to increase the flexibility of the hinge fitting.

7. The device as set forth in claim 1, further comprising means for attaching the at least one hinge fitting to a spar web.

8. The device as set forth in claim 1, wherein the ports include a load bearing surface.

9. The device as set forth in claim 1, further comprising a bushing inserted in at least one of the spar web ports.

10. The device as set forth in claim 9, further comprising a shear pin interface mounted in the at least one bushing, wherein the shear pin interface is configured to receive one of the shear pins.

11. The device as set forth in claim 10, further comprising a washer mounted between a flange configured on the shear pin interface and the spar web.

12. The device as set forth in claim 9, wherein the bushing is configured to substantially prevent rotation and drift of the shear pin interfaces.

13. The device as set forth in claim 10, wherein the shear pin interface includes an opening to receive the shear pins, and the diameter of the opening is less than the diameter of the shear pins.

14. An apparatus comprising:
    a unitary hinge fitting including:
        a first side couplable to a control surface;
        a plurality of bays, and
        a series of spaced lugs connectable to corresponding lugs on two or more rotary actuator segments; and
        a receptacle configured on the hinge fitting to receive a shear pin to couple the hinge fitting to the control surface.

15. The apparatus of claim 14, wherein a portion of material around at least one of the bays is removed to increase the flexibility of the hinge fitting.

16. The apparatus of claim 14, further comprising:
    a plurality of lugs configured on the hinge fitting to couple the rotary actuator segments to the hinge fitting.

17. The apparatus of claim 14, further comprising:
    holes through each of the bays to accommodate subsystem components.

* * * * *